US011822436B2

(12) United States Patent
Park

(10) Patent No.: US 11,822,436 B2
(45) Date of Patent: Nov. 21, 2023

(54) DATABASE RECOVERY BASED ON LOGICAL TIMESTAMP

(71) Applicant: SAP SE, Walldorf (DE)

(72) Inventor: Changgyoo Park, Seoul (KR)

(73) Assignee: SAP SE, Walldorf (DE)

( * ) Notice: Subject to any disclaimer, the term of this patent is extended or adjusted under 35 U.S.C. 154(b) by 19 days.

(21) Appl. No.: 17/547,423

(22) Filed: Dec. 10, 2021

(65) Prior Publication Data

US 2023/0185676 A1 Jun. 15, 2023

(51) Int. Cl.
*G06F 16/23* (2019.01)
*G06F 11/14* (2006.01)

(52) U.S. Cl.
CPC ...... *G06F 11/1469* (2013.01); *G06F 11/1471* (2013.01); *G06F 16/2379* (2019.01)

(58) Field of Classification Search
CPC ............. G06F 11/1469; G06F 11/1471; G06F 16/2379
See application file for complete search history.

(56) References Cited

U.S. PATENT DOCUMENTS

| | | | | | |
|---|---|---|---|---|---|
| 5,278,982 | A | * | 1/1994 | Daniels | G06F 11/1471 714/E11.122 |
| 8,949,190 | B2 | * | 2/2015 | Schreter | G06F 16/00 707/648 |
| 9,058,371 | B2 | * | 6/2015 | Thomsen | G06F 16/2379 |
| 11,403,192 | B1 | * | 8/2022 | Chockalingam | G06F 11/1451 |
| 2009/0182783 | A1 | * | 7/2009 | Lomet | G06F 16/2322 |
| 2012/0109895 | A1 | * | 5/2012 | Zwilling | G06F 16/2308 707/648 |
| 2018/0232412 | A1 | * | 8/2018 | Bensberg | G06F 11/1474 |
| 2018/0253468 | A1 | * | 9/2018 | Gurajada | G06F 16/2255 |
| 2018/0336258 | A1 | * | 11/2018 | Lee | G06F 11/36 |
| 2020/0293509 | A1 | * | 9/2020 | Lee | G06F 16/278 |
| 2022/0253363 | A1 | * | 8/2022 | Zhang | G06F 16/273 |

* cited by examiner

*Primary Examiner* — Merilyn P Nguyen
(74) *Attorney, Agent, or Firm* — Buckley, Maschoff & Talwalkar LLC

(57) ABSTRACT

A system includes reception of a request for recovery of a database to a recovery time, determination of a recovery logical timestamp corresponding to the recovery time, identification of database log records associated with a logical timestamp preceding the recovery logical timestamp, application of the identified database log records to the database sequentially according to log sequence number, identification, after applying the identified database log records, of one or more open transactions on the database, identification of a first one or more of the one or more open transactions which are associated with a commit log record associated with a logical timestamp preceding the recovery logical timestamp, and, in response to identification of the first one or more of the one or more open transactions, committing of the first one or more of the one or more open transactions.

6 Claims, 6 Drawing Sheets

200

| Log Sequence Number | LSN1 | LSN2 | LSN2 | LSN2 | LSN3 | LSN4 |
|---|---|---|---|---|---|---|
| Logical Timestamp | LT1 | LT1 | LT1 | LT2 | LT3 | LT3 |
| Transaction | TX1: INSERT A | TX2: INSERT A | TX1: PREPARE LT1 | TX2: PREPARE LT2 | TX2: COMMIT, LT3 | TX1: COMMIT, LT2 |
| Log Record | 1:INSERT_A:LT1 | 2:INSERT_B:LT1 | | | 2:COMMIT:LT3 | 1:COMMIT:LT2 |

| Log Sequence Number | LSN10 | LSN11 | LSN11 | LSN11 | LSN12 | LSN13 | LSN14 | LSN15 |
|---|---|---|---|---|---|---|---|---|
| Logical Timestamp | LT1 | LT1 | LT1 | LT1 | LT1 | LT1 | LT2 | LT3 |
| Transaction | TX1: INSERT A | TX2: INSERT A | TX1: START PREPARE, LT1 | TX2: START PREPARE, LT1 | TX2: PREPARE | TX1: PREPARE | TX2: COMMIT | TX1: COMMIT |
| Log Record | 1:INSERT_A :LT1 | 2:INSERT_A :LT1 | | | 2:PREPARE: LT1 | 1:PREPARE: LT1 | 2:COMMIT: LT2 | 1:COMMIT: LT3 |

550

| Log Sequence Number | LSN1 | LSN2 | LSN3 | LSN4 | LSN4 | LSN4 | LSN5 | LSN6 |
|---|---|---|---|---|---|---|---|---|
| Logical Timestamp | LT1 | LT1 | LT1 | LT1 | LT1 | LT1 | LT2 | LT3 |
| Transaction | TX1: INSERT B | TX2: INSERT B | TX1: PREPARE, LT1 | TX2: PREPARE, LT1 | | | TX2: COMMIT | TX1: COMMIT |
| Log Record | 1:INSERT_B :LT1 | 2:INSERT_B :LT1 | 1:PREPARE: LT1 | 2:PREPARE: LT1 | | | 2:COMMIT: LT2 | 1:COMMIT: LT3 |

*FIG. 5*

DATABASE RECOVERY BASED ON LOGICAL TIMESTAMP

BACKGROUND

Conventional databases store large amounts of data in the form of database tables. During operation, changes are made to the database tables and these changes (i.e., "transactions") are recorded in logs. For example, when a transaction is "committed" to a database, a log record is created which associates the commit of the transaction with a respective logical timestamp (LT). The LT monotonically increases with each transaction commit. Log records are created for other transaction-related operations (e.g., insert, pre-commit) as well, and all created log records (e.g., insert, pre-commit, commit) are assigned a monotonically-incremented log sequence number (LSN).

The log records and LTs may be used to determine whether certain changes can be seen by a given read operation. If the read operation is associated with a LT which is earlier than a LT associated with the commit of a transaction (as indicated by a log record associated with the commit of the transaction), the read operation will not be allowed to see the changes made by the committed transaction. Log records may also provide information to facilitate reversal, or rollback, of transactions. Additionally, log records may be used in a point-in-time-recovery (PITR) process which returns the database tables to a state in which they existed at a particular point in time.

Conventional PITR is based on the LSNs of the log records. In a non-distributed database, a PITR command associated with a human-readable time is received. The time is translated to a corresponding LSN, and the transactions reflected by the log records are applied to the database up until the log record associated with the corresponding LSN. Therefore, a log record associated with a commit of a first transaction and an LSN greater than the corresponding LSN will not be applied, even if the commit occurred prior to the human-readable time.

A distributed database consists of several database nodes, with each node storing one or more data volumes of the database. Each node offers the same user interfaces, functionalities, and level of consistency as the single node of a non-distributed database. PITR in a distributed database assumes the existence of a single fixed coordinator node for every distributed transaction, and each point in time is represented by a coordinator node-specific LSN. Therefore, as described above, PITR includes translation of a human-readable time to a corresponding coordinator node-specific LSN, and the transactions reflected by the log records of the coordinator node are applied to the database up until the log record associated with this LSN. However, in order for each other (i.e., worker) node of the distributed database to properly apply its log records in response to the PITR command, the coordinator node has to determine, for each worker node, a worker node-specific LSN which corresponds to the corresponding coordinator node-specific LSN. Consequently, the coordinator node becomes a contention point which inhibits parallel application of the log records of each node.

Systems are desired to improve the logical consistency and/or efficiency of conventional PITR processes.

BRIEF DESCRIPTION OF THE DRAWINGS

FIG. 2 illustrates relationships between LSNs, LTs, transaction phases and log records according to some embodiments.

FIG. 5 illustrates relationships between LSNs, LTs, transaction phases and log records within a coordinator node and within a worker node according to some embodiments.

DETAILED DESCRIPTION

The following description is provided to enable any person in the art to make and use the described embodiments. Various modifications, however, will remain readily-apparent to those in the art.

LTs are globally consistent across distributed nodes and therefore a single LT represents a particular database snapshot. Embodiments therefore perform PITR based on the LTs, rather than the LSNs, embedded in the log records. Generally, embodiments recover a database to a particular point-in-time, or snapshot, based on a LT corresponding to the point-in-time/snapshot.

According to some embodiments, and for each database node, all log records are applied which have a LT which precedes (i.e., is less than) the LT corresponding to a specified time. After such processing, the transaction state of any open transaction is resolved based on log records subsequent to the LT. For example, any open transaction which was committed before the LT is committed, and all other open transactions are rolled back.

Figure 1:
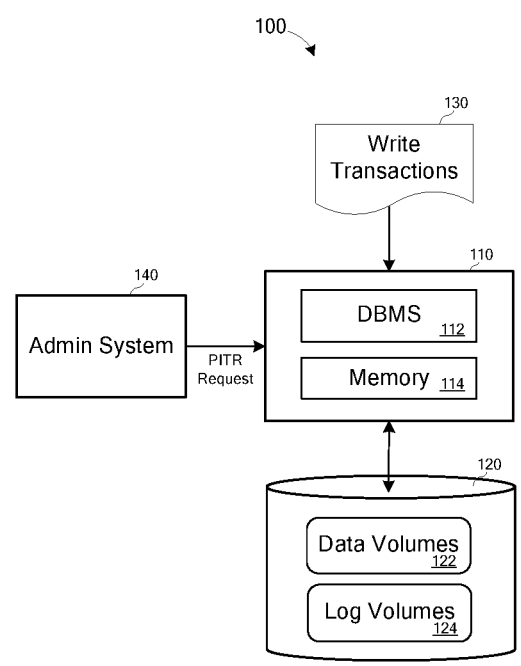
FIG. 1 is a block diagram of a single-node database architecture according to some embodiments.

FIG. 1 is a block diagram of system 100 according to some embodiments. The illustrated elements of system 100 may be implemented using any suitable combination of computing hardware and/or software that is or becomes known. Such combinations may include one or more pro-grammable processors (microprocessors, central processing units, microprocessor cores, execution threads), one or more non-transitory storage media, and processor-executable program code. In some embodiments, two or more elements of system 100 are implemented by a single computing device. One or more elements of system 100 may be implemented by an on-premise system and/or using cloud-based resources.

System 100 includes database server 110 and persistent storage 120. Database server 110 may comprise server hardware such as but not limited to an on-premise computer server. Database management system (DBMS) 112 may comprise program code of any query-responsive DBMS that is or becomes known, including but not limited to a structured-query language (SQL) relational DBMS. Memory 114 may include a cache for storing recently-used data as is known in the art. In some embodiments, database server 110 provides an "in-memory" database, in which memory 114 stores a cache as well as the full database during operation.

Persistent storage 120 includes data volumes 122. Data volumes 122 may comprise database tables of a database, as well as database snapshots and other backup-related files. Upon startup, in the case of an in-memory database, the database tables of data volumes 122 are loaded into memory 114. Log volumes 124 comprise log records of database transactions and allow auditing and transaction roll-back in case of a database crash as is known in the art. Log records of log volumes 124 also provide PITR as described herein.

Database server 110 receives write transactions from clients, which may comprise database applications (not shown). Write transactions 130 may comprise requests to create, update and/or delete data stored in data volumes 122. Database server 110 executes write transactions 130 using a two-phase commit process as will be described below. Such execution generates corresponding log records of log volumes 124, as will also be described below.

Administrator system 140 may comprise a computing system which accesses an administrative interface provided by database server 110 to configure, manage and monitor operation of database server 110 and storage 120. In one example, an administrator operates administrator system 140 to submit a PITR request to database server 110. The PITR request may comprise a request to recover data volumes 122 to the state at which they existed at a particular time in the past.

FIG. 2 includes table 200 illustrating relationships between LSNs, LTs, transaction phases and log records of a single database node over time according to some embodiments. As described above, each log record (shown in columns 210, 220, 250 and 260) is associated with a monotonically-increasing LSN which increases each time a log record is written to the log volumes. Log records are written upon receipt of a request to create, update and/or delete data (see, e.g., columns 210 and 220), upon commit of a transaction (see, e.g., columns 250 and 260), and upon rollback of a transaction (not shown). Each log record also indicates the LT value (e.g., LT1, LT2, LT3) at the time of the transaction receipt, commit, or rollback.

According to a two-phase commit process, an incoming transaction causes generation of a pre-commit log record that embeds the current LT and the LT is then incremented. Column 230 illustrates generation of a pre-commit log record in response to incoming transaction TX1, which embeds the current LT (i.e., LT1). The LT is advanced and, as a result, the pre-commit log record of column 240 which is generated based on incoming transaction TX2 embeds the incremented LT (i.e., LT2).

The transaction commit is completed by generating a commit log record that includes the LT at the time of the commit. The commit log records are not necessarily written in the same order as the LTs are generated. For example, the commit log record of column 250 includes LT3 because transaction TX2 committed after the LT was advanced to LT3 as a result of generation of the pre-commit log record of column 140. It is assumed that transaction TX1 committed before the LT was advanced to LT3 as a result of generation of the pre-commit log record of column 240. Accordingly, the commit log record of column 260 associates the commit of TX1 with LT2, even though the commit log record of column 260 (i.e., at LSN4) was written after the commit log record of column 250 (i.e., at LSN3). Conventional systems which perform PITR by applying log records up until a LSN corresponding to a specified time would lose such updates which are committed prior to the specified time and written to the logs after the specified time.

Figure 3:
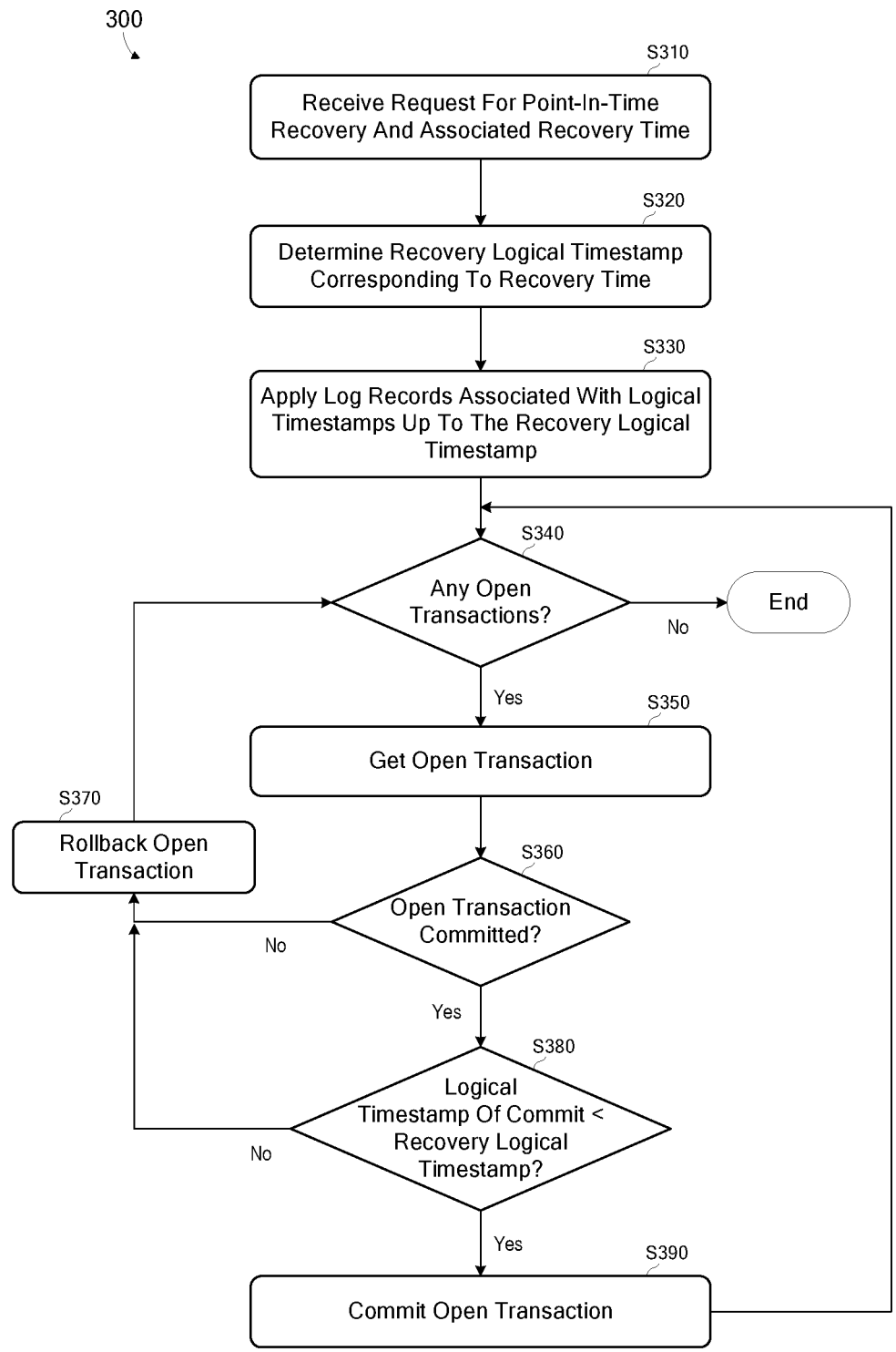
FIG. 3 comprises a flow diagram of a process to apply log records in a PITR process according to some embodiments.

FIG. 3 comprises a flow diagram of process 300 to perform PITR according to some embodiments. In some embodiments, various hardware elements execute program code of a DBMS to perform process 300. Process 300 and other processes described herein may be executed by a database system using any suitable combination of hardware and software. Program code embodying these processes may be stored by any non-transitory tangible medium, including a fixed disk, a volatile or non-volatile random-access memory, a DVD, a Flash drive, and a magnetic tape, and executed by any suitable processing unit, including but not limited to one or more programmable microprocessors, microcontrollers, processing cores, and processor threads. Embodiments are not limited to the examples described below.

Initially, at S310, a request for PITR is received. The request includes a "recovery time", which is a human-readable time (e.g., 4 Apr. 2021, 12:00:00.0000) to which the state of the database is to be recovered. As mentioned above, the request may be received from an administrator via an administrator interface. An administrator may operate an administrator system to execute a Web browser and may input a Uniform Resource Locator corresponding to an administrator interface of a database. In response, the database transmits a Web page or a Web application to the administrator system. The administrator may then interact with the Web page or Web application to submit a request for PITR and associated recovery time to the database.

A recovery logical timestamp corresponding to the recovery time is determined at S320. The database may include a mapping between LTs and human-readable times. For example, each time a LT is generated, a record may be created indicating the human-readable time at which the LT was generated. In such an example, S320 may therefore consist of determining a LT which is associated with a time closest to but not after the received recovery time. For purposes of the present description, and with respect to table 200, it will be assumed that the determined recovery LT is LT3.

At S330, all log records are applied to the database in LSN order until a log record is encountered which is associated with the recovery LT. With respect to FIG. 2, and in view of the recovery LT LT3, all log records up to and including LSN2 are applied. Next, at S340, it is determined whether any transactions are open. An open transaction is a transaction that was received (i.e., as indicated by log records such as those shown in columns 210 and 220) but was not committed or rolled back according to log records associated with LTs up to and including LT2. As shown in FIG. 2, both of transactions TX1 and TX2 were not committed or rolled back according to log records associated with LTs up to and including LT2, and are therefore both considered open at S340.

If no open transactions are identified, the PITR process is complete. If any open transactions are identified, flow proceeds to S350 to identify a specific one of the open transactions. It will be assumed that open transaction TX2 is identified at S350. At S360, it is determined whether the open transaction was eventually committed, without regard to when the transaction was committed. Accordingly, S360 comprises scanning all existing non-applied log records for a commit log record associated with the open transaction. If no associated commit log record exists (i.e., either an associated rollback record exists or no associated record exists), flow proceeds to S370 to rollback the open transaction and then returns to S340 to identify any other open transactions.

Continuing the present example, a commit log record associated with transaction TX2 exists (in column 250) and therefore the determination at S360 is affirmative and flow proceeds to S380. At S380, it is determined whether the LT of the commit log record associated with the open transaction is less than the recovery LT. Since the LT of the commit log record associated with transaction TX2 is LT3, and therefore not less than the recovery LT, flow proceeds to S370 to rollback transaction TX2 as described above. This behavior is logically consistent with the requested PITR because, as of the recovery LT of LT3, transaction TX2 was not yet committed.

Upon returning to S340, flow proceeds to S350 because transaction TX1 remains open. At S360, it is determined that transaction TX1 was committed because a commit log record associated with transaction TX1 exists (in column 260). The LT of the commit log record is LT2 because, as described above, transaction TX1 committed before the LT was incremented due to the pre-commit log record of column 240. Since LT2 precedes LT3, transaction TX1 is committed at S390. The commit of transaction TX1 is also logically consistent with the requested PITR because transaction TX1 was already committed as of the recovery LT of LT3.

Flow continues to cycle in the above manner until it is determined at S340 that no open transactions exist, at which point process 300 terminates.

Figure 4:
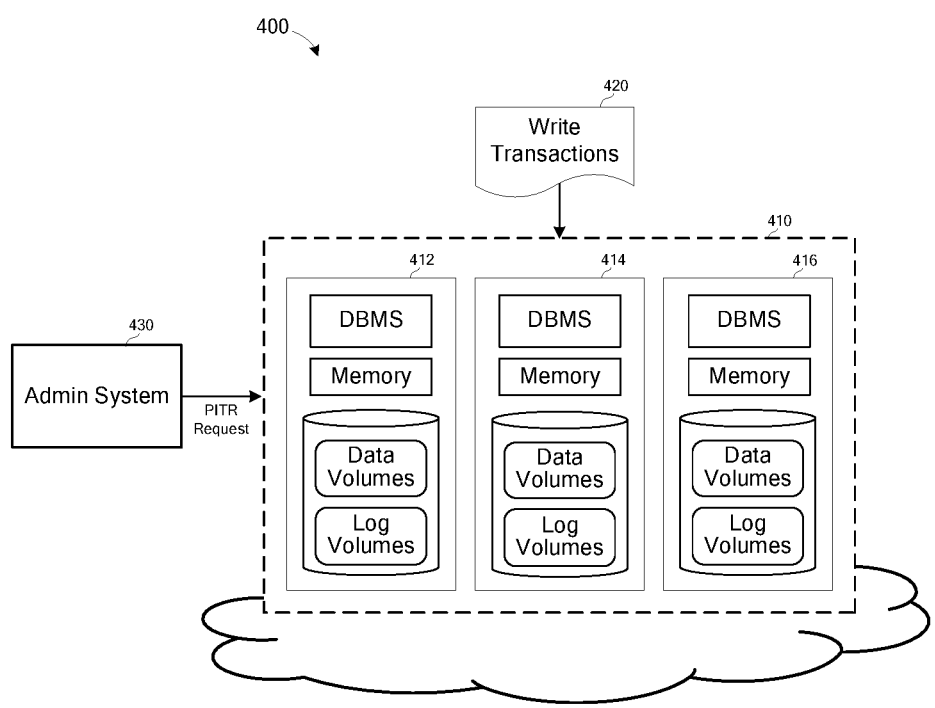
FIG. 4 is a block diagram of a distributed database architecture according to some embodiments.

Although the above description relates to a single node database, embodiments may also be implemented within a distributed database. System 400 of FIG. 4 includes database 410 consisting of three nodes 412, 414 and 416. Each of nodes 412 may be configured with a DBMS, memory and persistent storage as described above with respect to system 100. The data stored in the data volumes of each node, taken together, represent the full database, and the database processes of each node operate to transparently provide the data of the full database to client applications. During operation, write transactions 420 may be received and routed to an appropriate one of database nodes 412, 414 and 416.

Database 410 is depicted as cloud-based, and each database node 412, 414 and 416 may be implemented by one or more blade servers located in one or more cloud datacenters. The persistent storage of each database node may itself be distributed and/or remote from the DBMS of the database node. Database 410 may support multi-tenancy by providing multiple logical database systems which are programmatically isolated from one another.

Administrator system 430 may be operated to submit a PITR request to database 410 as described above. The PITR request may be received by any node, which determines a LT corresponding to the requested recovery time and broadcasts the LT to all other nodes. Unlike conventional systems, a coordinator node is not required to manage the PITR process (e.g., determine a LSN of another node which corresponds to a particular LSN of the coordinator node), and all nodes may identify and apply particular ones of their respective log records in parallel to fulfill the PITR request.

To illustrate a PITR process within a distributed database according to some embodiments, FIG. 5 includes table 500 illustrating relationships between LSNs, LTs, transaction phases and log records of a coordinator node of transactions TX1 and TX2, and table 550 illustrating relationships between LSNs, LTs, transaction phases and log records of another node of the distributed database. According to the present description, the first node that initiates a transaction becomes the coordinator node for that transaction, and might be any node of the distributed database. The coordinator node of a transaction coordinates the two-phase commit process in case that transaction modifies the data of multiple database nodes. Only the coordinator node can generate LTs and only the coordinator node can initiate a two-phase commit for the transaction.

As a transaction starts to commit, it takes the current LT from the coordinator node. Once the commit has been prepared for, and a pre-commit log record having a node-specific LSN is stored with the current LT, the coordinator node increments the LT value and all other nodes receive a copy of the incremented LT. Once a transaction decides to commit itself, it generates a commit log record having a new node-specific LSN and the new LT, which is considered the LT of the transaction.

In response to a PITR request, the database nodes apply their log records as described with respect to process 300 in order to recover the database to the requested point-in-time. In particular, a node may receive a request for PTIR and an associated recovery time at S310 as described above. The node then determines a recovery LT based on the recovery time at S320. The node may utilize a mapping between LTs and human-readable times to facilitate the determination at S320. The LT and PITR request may then be broadcast to each other node of the distributed database.

Upon receiving the LT and request, each node executes S330 through S390 as described above to apply appropriate log records and commit or rollback open transactions. For example, assuming the recovery LT is LT3, the coordinator node applies its log records up through and including the log record associated with coordinator node-specific LSN14. Similarly, the worker node applies its log records up through and including the log record associated with worker node-specific LSN5.

The coordinator node will rollback rather than commit open transaction TX1 because the LT of the commit log record at LSN15 for transaction TX1 is LT3. The worker node will also rollback its open transaction TX1 because the LT of the commit log record at LSN6 for transaction TX1 is LT3.

Figure 6:
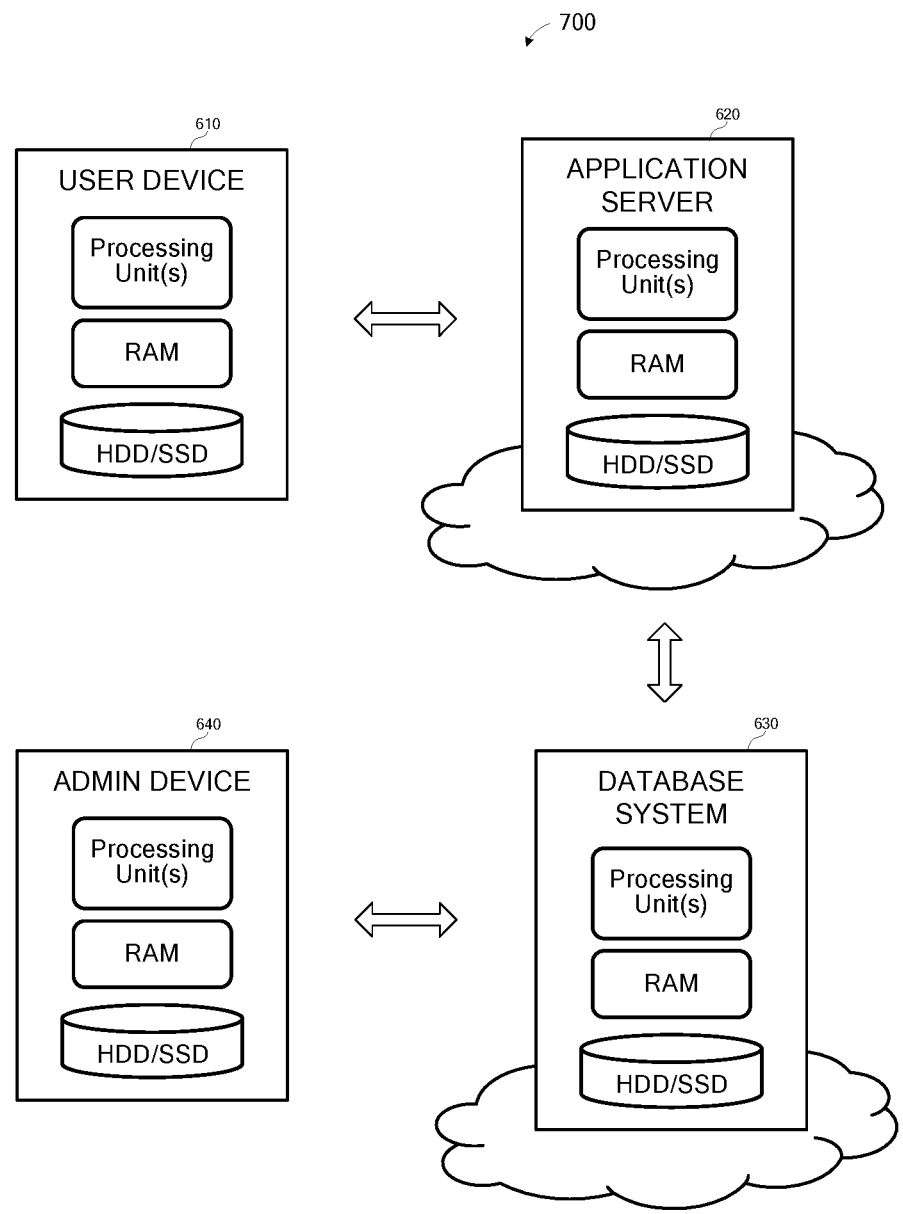
FIG. 6 is a block diagram of a cloud-based database architecture according to some embodiments.

FIG. 6 illustrates cloud-based database deployment 600 according to some embodiments. The illustrated components may reside in one or more public clouds providing self-service and immediate provisioning, autoscaling, security, compliance and identity management features.

User device 610 may interact with applications executing on application server 620, for example via a Web Browser executing on user device 610, in order to create, read, update and delete data managed by database system 630. Database system 630 may store data as described herein and may execute processes as described herein to perform PITR in response to commands received from, for example, administrator device 640. Application server 620 and/or database system 630 may comprise cloud-based compute resources, such as virtual machines, allocated by a public cloud provider. As such, application server 620 and database system 630 may be subjected to demand-based resource elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of an embodiment may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid-state Random-Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
a first at least one processing unit; and
a first non-transitory computer-readable medium storing program code that, when executed by the first at least one processing unit, causes the first at least one processing unit to perform operations comprising:
determining a recovery logical timestamp corresponding to a recovery time;
identifying database log records associated with a logical timestamp preceding the recovery logical timestamp;
applying the identified database log records to the database sequentially;
identifying one or more open transactions;
identifying a first one or more of the one or more open transactions which are associated with a commit log record associated with a logical timestamp preceding the recovery logical timestamp;
identifying a second one or more of the one or more open transactions which are not associated with a commit log record associated with a logical timestamp preceding the recovery logical timestamp;
rolling back the second one or more of the one or more open transactions; and
committing the first one or more of the one or more open transactions.

2. The system according to claim 1, further comprising:
a second at least one processing unit; and
a second non-transitory computer-readable medium storing second program code that, when executed by the second at least one processing unit, causes the second at least one processing unit to perform operations comprising:
identifying database log records of a second database node associated with a logical timestamp preceding the recovery logical timestamp;
applying the identified database log records of the second database node to the second database node sequentially;
identifying a second one or more open transactions of the second database node;
identifying a first one or more of the second one or more open transactions which are associated with a commit log record of the second database node associated with a logical timestamp preceding the recovery logical timestamp;
identifying a second one or more of the second one or more open transactions which are not associated with a commit log record of the second database node associated with a logical timestamp preceding the recovery logical timestamp;
rolling back the second one or more of the second one or more open transactions; and
committing the first one or more of the second one or more open transactions to the second database node.

3. A computer-implemented method, comprising:
receiving a request for recovery of a database to a recovery time;
determining a recovery logical timestamp corresponding to the recovery time;
identifying database log records associated with a logical timestamp preceding the recovery logical timestamp;
applying the identified database log records to the database sequentially according to log sequence number;
after applying the identified database log records, identifying one or more open transactions on the database;
identifying a first one or more of the one or more open transactions which are associated with a commit log record associated with a logical timestamp preceding the recovery logical timestamp;
identifying a second one or more of the one or more open transactions which are not associated with a commit log record associated with a logical timestamp preceding the recovery logical timestamp;
rolling back the second one or more of the one or more open transactions; and
committing the first one or more of the one or more open transactions.

4. The method according to claim 3, further comprising:
receiving the logical timestamp at a second database node;
identifying database log records of the second database node associated with a logical timestamp preceding than the recovery logical timestamp;
applying the identified database log records of the second database node to the second database node sequentially according to log sequence number of the second database node;
identifying a second one or more open transactions of the second database node;
identifying a first one or more of the second one or more open transactions which are associated with a commit log record of the second database node associated with a logical timestamp preceding the recovery logical timestamp;
identifying a second one or more of the second one or more open transactions which are not associated with a commit log record associated with a logical timestamp preceding the recovery logical timestamp;
rolling back the second one or more of the second one or more open transactions; and
committing the first one or more of the second one or more open transactions to the second database node.

5. A non-transitory computer-readable medium storing program code that, when executed by at least one processing unit, causes the at least one processing unit to perform operations comprising:
identifying database log records associated with a logical timestamp preceding a recovery logical timestamp;

applying the identified database log records to the database sequentially according to log sequence number;

after applying the identified database log records, identifying one or more open transactions on the database;

identifying a first one or more of the one or more open transactions which are associated with a commit log record associated with a logical timestamp preceding the recovery logical timestamp;

identifying a second one or more of the one or more open transactions which are not associated with a commit log record associated with a logical timestamp preceding the recovery logical timestamp;

rolling back the second one or more of the one or more open transactions; and committing the first one or more of the one or more open transactions.

6. The medium according to claim 5, the program code, when executed by at least one processing unit, causes the at least one processing unit to perform operations comprising:

identifying database log records of a second database node associated with a logical timestamp preceding than the recovery logical timestamp;

applying the identified database log records of the second database node to the second database node sequentially according to log sequence number of the second database node;

identifying a second one or more open transactions of the second database node;

identifying a first one or more of the second one or more open transactions which are associated with a commit log record of the second database node associated with a logical timestamp preceding the recovery logical timestamp;

identifying a second one or more of the second one or more open transactions which are not associated with a commit log record associated with a logical timestamp preceding the recovery logical timestamp;

rolling back the second one or more of the second one or more open transactions; and committing the first one or more of the second one or more open transactions to the second database node.

* * * * *